United States Patent
Romero et al.

(10) Patent No.: US 10,951,616 B2
(45) Date of Patent: Mar. 16, 2021

(54) PROXIMITY-BASED DEVICE AUTHENTICATION

(71) Applicant: Spruce Labs, Inc., Denver, CO (US)

(72) Inventors: Taylor Romero, Denver, CO (US); Ryan Johnson, Battle Creek, MI (US)

(73) Assignee: Spruce Labs, Inc., Denver, CO (US)

( * ) Notice: Subject to any disclaimer, the term of this patent is extended or adjusted under 35 U.S.C. 154(b) by 127 days.

(21) Appl. No.: 16/179,520

(22) Filed: Nov. 2, 2018

(65) Prior Publication Data
US 2020/0145414 A1 May 7, 2020

(51) Int. Cl.
| H04L 29/06 | (2006.01) |
| H04W 12/06 | (2021.01) |
| H04W 4/80 | (2018.01) |
| H04W 4/60 | (2018.01) |

(52) U.S. Cl.
CPC ...... H04L 63/0876 (2013.01); H04L 63/0236 (2013.01); H04L 63/102 (2013.01); H04L 63/107 (2013.01); H04W 12/06 (2013.01); H04W 4/60 (2018.02); H04W 4/80 (2018.02)

(58) Field of Classification Search
CPC ............ H04L 63/0876; H04L 63/0236; H04L 63/102; H04L 63/107; H04W 12/06; H04W 4/14
See application file for complete search history.

(56) References Cited

U.S. PATENT DOCUMENTS

| 8,630,192 | B2 | 1/2014 | Raleigh |
| 8,640,197 | B2 | 1/2014 | Heffez |
| 8,732,697 | B2 | 5/2014 | Jonnala et al. |
| 8,893,246 | B2 | 11/2014 | Jover et al. |
| 9,170,718 | B2 | 10/2015 | Wynn et al. |
| 9,693,296 | B2 | 6/2017 | Wan et al. |
| 9,729,930 | B2 | 8/2017 | Greenfield |
| 9,801,057 | B2 | 10/2017 | Xia |
| 10,657,242 | B1* | 5/2020 | Xia ................ H04W 12/08 |
| 10,657,289 | B2* | 5/2020 | Graf ................ H04W 4/023 |
| 2007/0167182 | A1* | 7/2007 | Tenhunen ............ H04M 15/55 455/512 |
| 2012/0280783 | A1 | 11/2012 | Gerhardt et al. |
| 2014/0370879 | A1* | 12/2014 | Redding .......... H04M 3/42178 455/419 |
| 2016/0247144 | A1 | 8/2016 | Oh et al. |
| 2016/0337346 | A1* | 11/2016 | Momchilov ...... H04W 12/0023 |
| 2017/0017964 | A1 | 1/2017 | Janefalkar et al. |
| 2017/0099647 | A1 | 4/2017 | Shah et al. |
| 2017/0104708 | A1* | 4/2017 | Reddy ................ H04L 51/20 |
| 2017/0374551 | A1* | 12/2017 | Shen .................. H04L 9/0822 |
| 2018/0124608 | A1 | 5/2018 | Huang |
| 2018/0191501 | A1 | 7/2018 | Lindemann |

* cited by examiner

*Primary Examiner* — Chau Le
*Assistant Examiner* — Andrew Suh
(74) *Attorney, Agent, or Firm* — Holzer Patel Drennan (57) ABSTRACT

A method disclosed herein generally facilitates authenticating of an electronically-detectable device identifier against a user account identifier, such as a user-provided phone number, to ensure that a user account identified by the user account identifier is accessible by a user who is in possession of the electronic device having the device identifier.

21 Claims, 7 Drawing Sheets

PROXIMITY-BASED DEVICE AUTHENTICATION

BACKGROUND

It is common for individuals to provide personal identification information when subscribing to various information services. To prevent the collection of false information, some service providers make use of tools that authenticate user-provided personal information. For example, a user providing an email address to create an online account may be asked to authenticate the email address by clicking a link in a received email.

In contrast with the authentication of personal information, it can be much more challenging to authenticate a user's personal information against a particular personal mobile device. For instance, a personal mobile device may transmit a media access control (MAC) address when performing certain operations, such as connecting to a public Wi-Fi access point. Consequently, entities (e.g., businesses and restaurants) that provide Wi-Fi may be able to identify the devices that use their Wi-Fi networks but not necessarily the people who are in possession of those devices. Even if a user were to manually provide (e.g., type) a phone number or other personal information when logging onto a business's Wi-Fi portal on a mobile phone browser, the business is still unable to easily determine whether the phone number provided is, in fact, the phone number for the device requesting access to the Wi-Fi network.

SUMMARY

The herein disclosed technology makes it possible to authenticate an association between a specific electronic device and a user-provided phone number without requiring a user to perform burdensome authentication tasks. According to one implementation, a disclosed method includes receiving a device identifier identifying an electronic device requesting access to a Wi-Fi network; enabling a temporary connection between the electronic device and the Wi-Fi network responsive to receipt of a user account identifier received through a captive portal; and initiating transmission of data identifying a uniform resource location (URL) to a location associated with the user account identifier. The method further provides for altering an access point setting to grant the electronic device with the received device identifier automatic non-captive access to the Wi-Fi network, responsive to receipt of a request to access the URL originating from a location on the Wi-Fi network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

The following description discloses techniques for proximity-based device authentication usable to confirm an association between user-provided personal identification information (e.g., a name, phone number) and an electronic device. According to one implementation, the disclosed authentication techniques are usable to confirm whether user account information provided to a web portal by an electronic device (e.g., a laptop, mobile phone) identifies an account of a user who is currently in possession of the electronic device. In another implementation, the disclosed authentication techniques are usable to confirm whether a phone number provided to a web portal from a mobile phone is also the phone number that a telecommunications company associates with the mobile phone. Unlike existing solutions that address these challenges, the disclosed authentication system imposes a minimal burden on the user of the mobile device throughout the authentication process.

Figure 1:
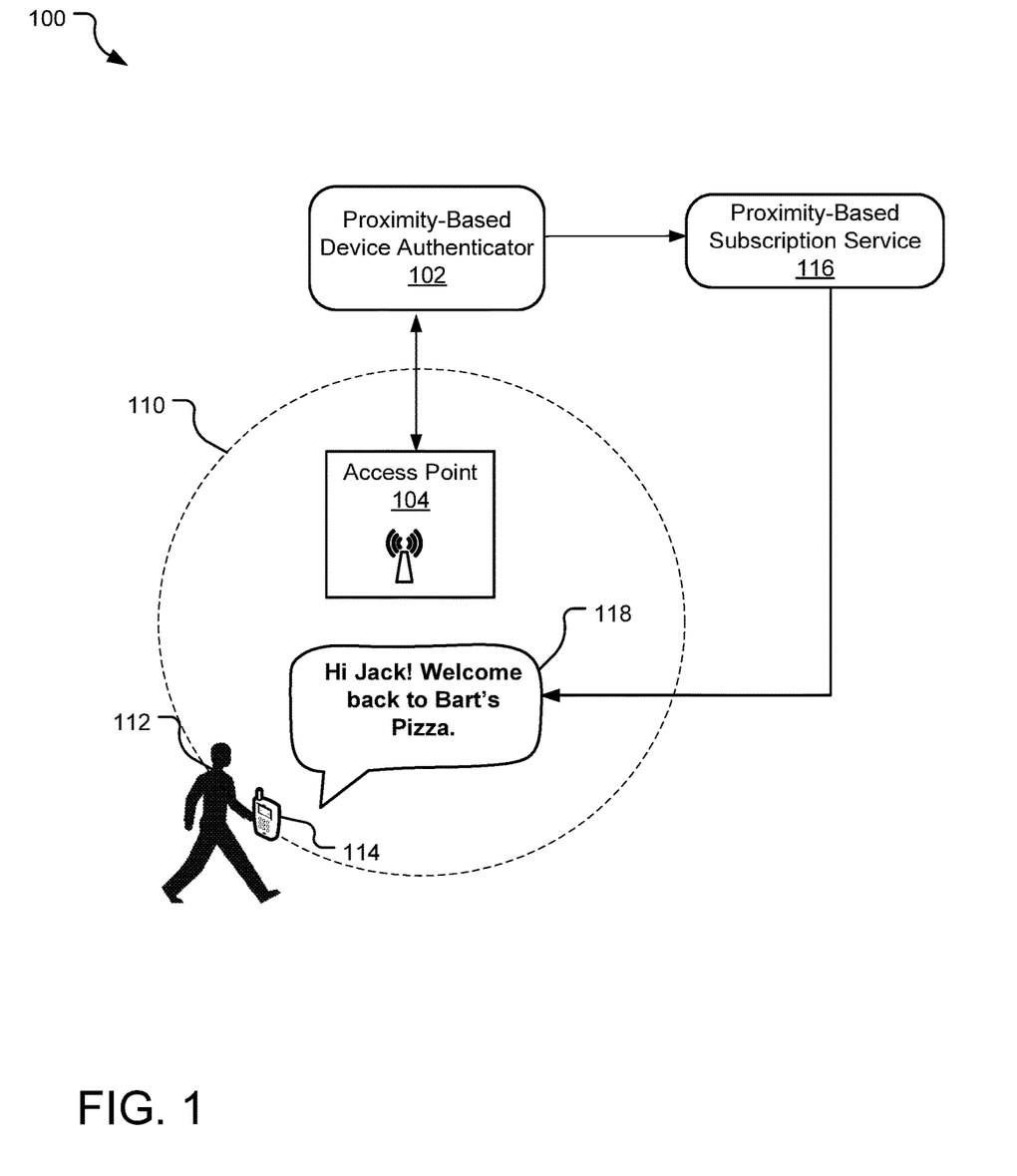
FIG. 1 illustrates an exemplary system that employs techniques for proximity-based device authentication when selectively permitting or denying access to a Wi-Fi network.

FIG. 1 illustrates an exemplary system 100 that employs techniques for proximity-based device authentication when selectively permitting or denying access to a Wi-Fi network 110 generated by an access point 104. The system 100 includes a proximity-based device authenticator 102 stored in memory that is executable to verify personal information provided by each user accessing the Wi-Fi network 110. In different implementations, different aspects of the proximity-based device authenticator 102 may be stored in different locations and/or executed by different processors, including one or more local processors within the access point 104 and remote processors external to the access point 104 (e.g., at one or more cloud-based processors).

When a user 112 walks within range of the Wi-Fi network 110, the user's mobile device 114 may attempt to automatically connect to the Wi-Fi network 110 or the user 112 may manually attempt to connect to the Wi-Fi network 110. The mobile device 114 transmits a request that includes a device identifier. If the mobile device 114 has not previously accessed the Wi-Fi network and/or the access point 104 is unable to identify the mobile device 114 as a device that has previously registered for access to the Wi-Fi network 110, the access point 104 redirects the mobile device to a captive portal managed by the proximity-based device authenticator 102.

As used herein, the term "captive portal" generally refers to a web page that each user of a public-access network may be obliged to view and interact with before being granted access to the network. In one implementation, the captive portal managed by the proximity-based device authenticator 102 prompts the user for personal identifying information including a user account identifier, such as a phone number. Before the mobile device 114 is granted access to the Wi-Fi network 110, the proximity-based device authenticator 102 performs operations to confirm that the user in possession of the mobile device 114 providing information through the captive portal is also able to access an account associated with the user account identifier. In one implementation, the user account identifier is a phone number and the proximity-based device authenticator 102 determines whether the phone number is, in fact, the phone number that a telecommunications company has assigned to the mobile device 114 that transmitted the phone number through the captive portal.

FIG. 1 is intended to present, by example and without limitation, one of a multitude of example systems in which the proximity-based device authenticator 102 may benefit an entity, such as a business, workplace, or public establishment managing the access point 104. In the illustrated example, the proximity-based device authenticator 102 is configured for communication with a proximity-based subscription service 116. In one implementation of the illustrated system 100, the user 112 elects to sign up for the proximity-based subscription service 116 (e.g., as an optional or mandatory condition) while initially connecting to the Wi-Fi network 110.

Once the mobile device 114 is subscribed with the proximity-based subscription service 116, the mobile device 114 may receive information by phone (e.g., via SMS message or a voice call) whenever the electronic device has a physical proximity satisfying certain location criteria, such as when the device is within range of a particular Wi-Fi network or one of a number of preidentified Wi-Fi networks. For example, a business establishment may wish to recognize a returning customer as he physically enters an affiliated establishment by texting an SMS message to the customer's mobile phone once it is connected to the Wi-Fi network of the establishment.

In the illustrated example, the Wi-Fi network 110 is at a local pizzeria ("Bart's Pizza") and the user 112 has previously enlisted to receive alerts from the proximity-based subscription service 116 in association with each of his visits to the pizzeria. When the mobile device 114 requests access to the Wi-Fi network 110, the proximity-based device authenticator 102 recognizes the device identifier (e.g., a MAC address or other hardware identifier) of the mobile device 114 as a registered device and permits the mobile device 114 to bypass the captive portal of the access point 104 and automatically connect to the Wi-Fi network 110 when the mobile device 114 requests access. Responsive to recognition of the registered device on the Wi-Fi network 110, the proximity-based device authenticator 102 sends a notification to the proximity-based subscription service 116 and the proximity-based subscription service 116, in turn, transmits an SMS message 118 (e.g., a greeting) to the mobile device 114.

In various implementations, the content of the SMS message 118 may vary. If the Wi-Fi network 110 is that of a public restaurant or store, the SMS message 118 may include a coupon or URL to an offer usable within the restaurant or business (e.g., "Hi Jack! Here's a link to a $5 off coupon as a reward for visiting our store 5 times this month!"). If the Wi-Fi network 110 is a place of business for the user 112, the SMS message 118 may, for example, include reminders for outstanding tasks that the user 112 is assigned to complete (e.g., "Welcome to work! Today is the deadline for [X] task so be sure to do [Y]"). Depending on the purpose for which the proximity-based subscription service 116 is utilized, the user 112 may receive a myriad of types of information via SMS alerts and/or voice calls that are each triggered based on a detected proximity between the mobile device 114 and the Wi-Fi network 110 (e.g., when the mobile device 114 connects to the Wi-Fi network 110).

Understandably, the capabilities of the aforementioned proximity-based subscription service 116 depend on the accuracy of stored associations between registered device identifiers (e.g., detectable MAC addresses or other hardware identifiers) and user account identifiers (e.g., user-provided phone numbers, email addresses, etc.). Without the functionality provided by the proximity-based device authenticator 102, the system 100 would be unable to verify the whether the user 112 in possession of the mobile device 114 is able to access an account identified by the user account identifier. If, for example, the user 112 provided an incorrect phone number when initially registering for the proximity-based subscription service 116, the system 100 may associate the incorrect phone with a detected device identifier of the mobile device 114. In this case, an SMS message may be sent to a wrong phone number every time the mobile device 114 connects to the Wi-Fi network 110, depriving the user 112 of the messages provided by the proximity-based subscription service 116 and also potentially annoying a recipient that inadvertently receives misdirected messages.

In one implementation, the proximity-based device authenticator 102 addresses the above-described challenges by verifying that a user phone number provided from the mobile device 114 is, in fact, assigned to a mobile device that is currently in the possession of the user 112 (e.g., on hand at the time of the provisioning of information to the captive portal). For example, the proximity-based device authenticator 102 may verify that the phone number provided from the mobile device 114 is also assigned to the mobile device 114 by a telecommunications company. Exemplary features of the proximity-based device authenticator 102 are discussed in greater detail with respect to the remaining figures.

Figure 2A:
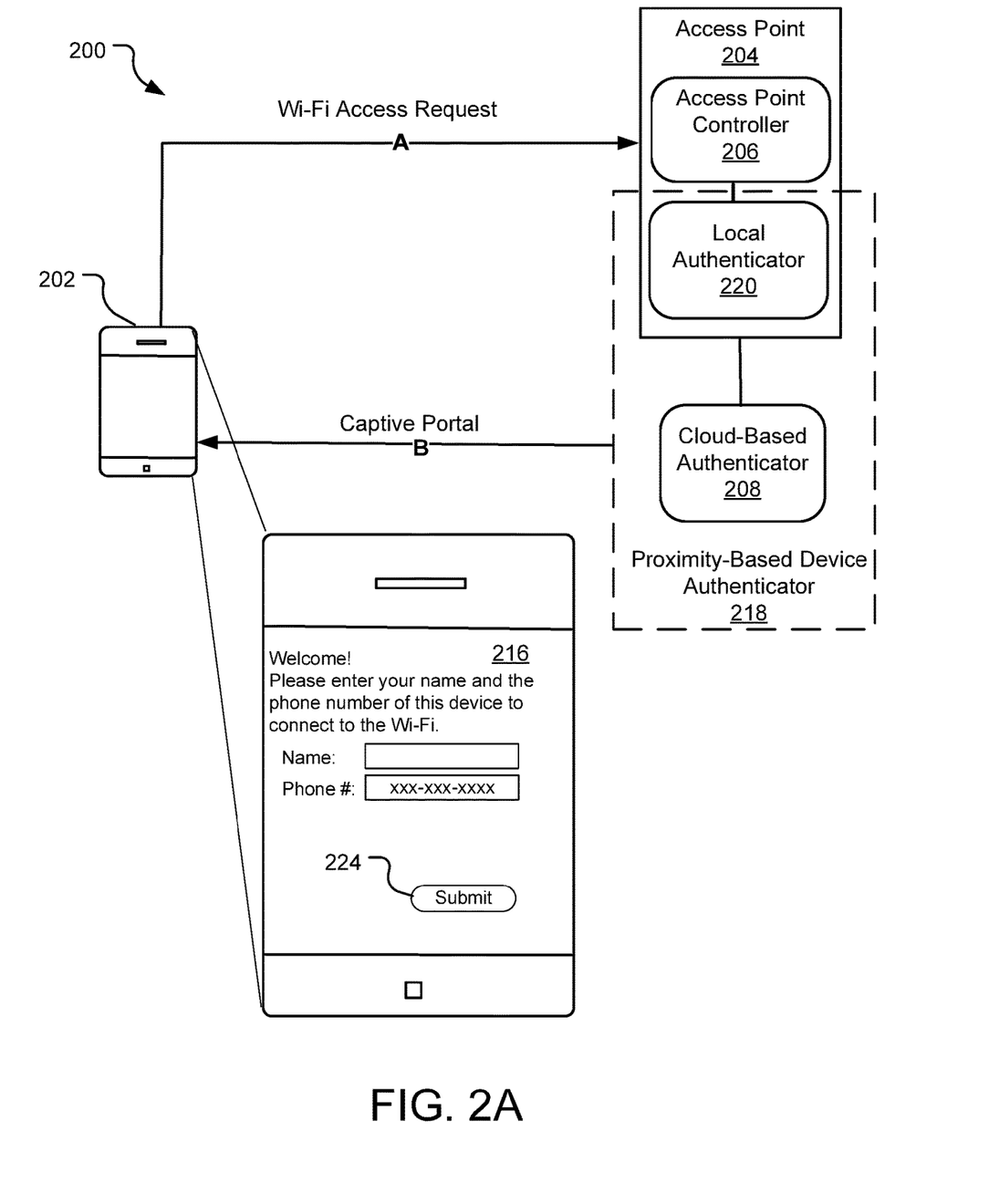
FIG. 2A illustrates example communications that are performed within a system as part of a proximity-based device authentication process.
Figure 2B:
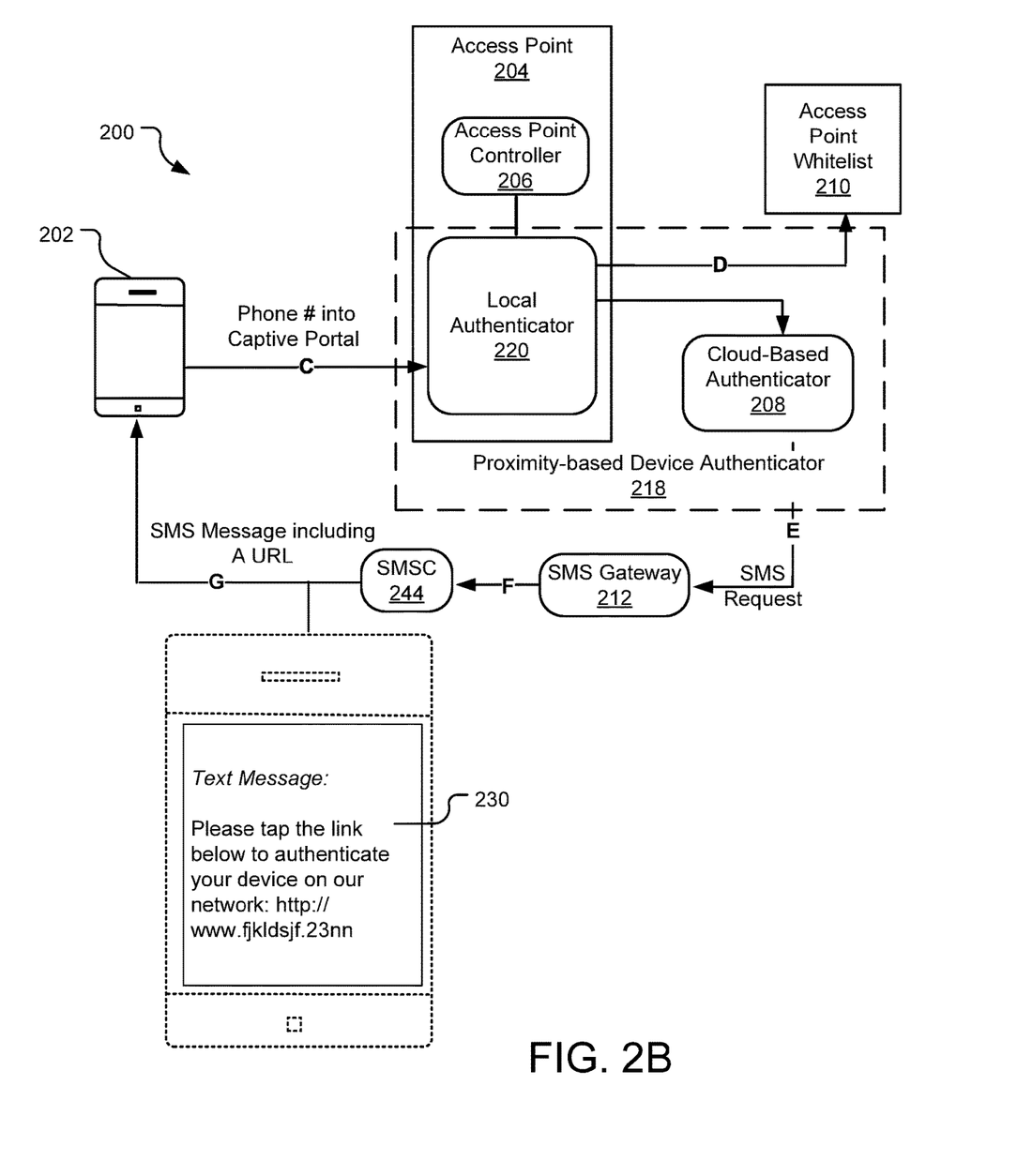
FIG. 2B illustrates further example communications that are performed by the system of FIG. 2A.
Figure 2C:
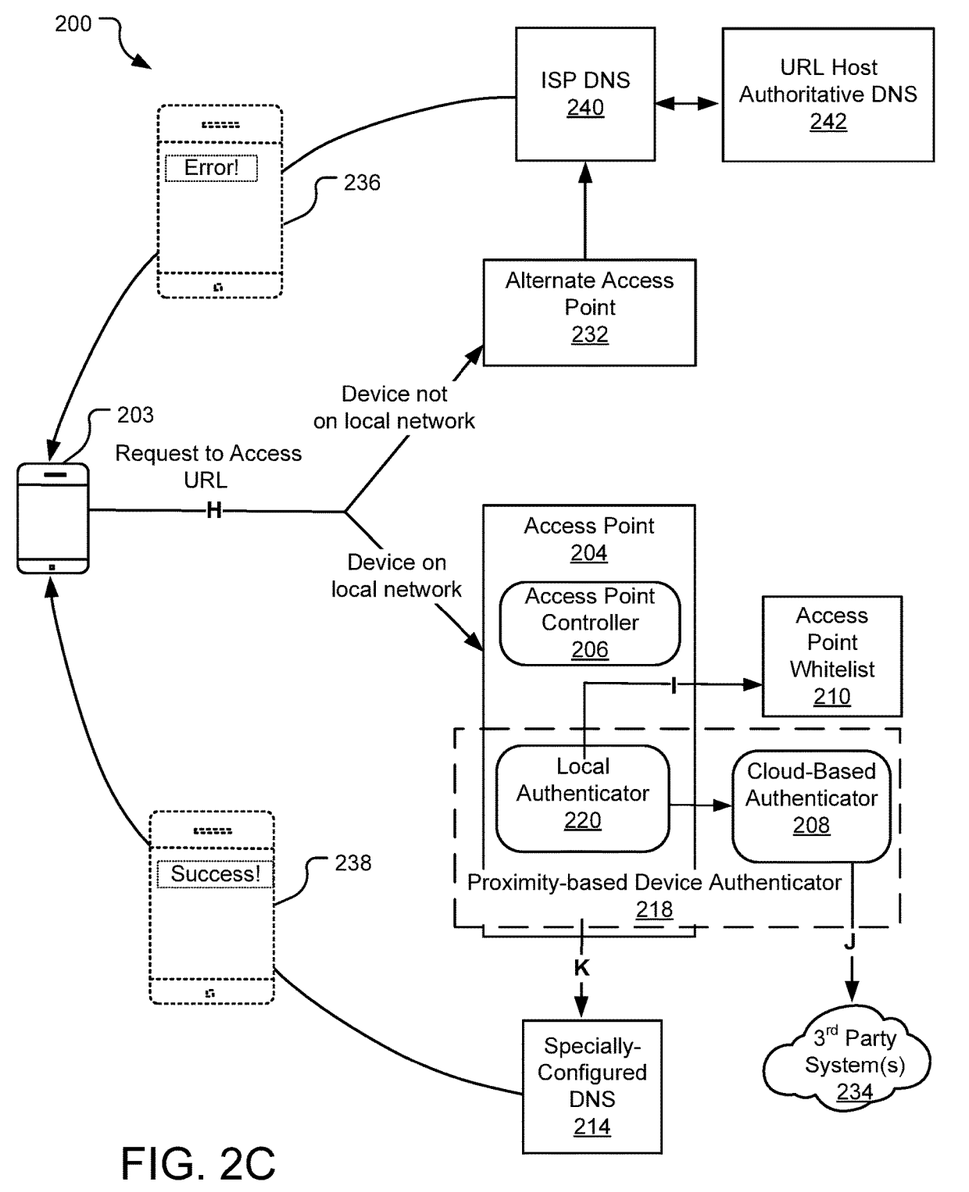
FIG. 2C illustrates still further example communications that are performed by the system of FIGS. 2A-2B.

FIG. 2A-2C, discussed below, illustrate various operations for authenticating a user account identifier, such as a phone number, in association with a mobile device. With respect to the specific example of FIG. 1, the example operations described with respect to FIG. 2A-2C may be performed during or responsive to a device's initial attempt to connect to a Wi-Fi network and/or during a sign-up process in which the user 112 subscribes to messages from the proximity-based subscription service 116.

FIG. 2A illustrates communications that are performed within an example system 200 as part of a proximity-based device authentication process. When a mobile device 202 is within range of a Wi-Fi network generated by an access point 204, the mobile device 202 transmits a request (e.g., annotated by an arrow "A") to the access point 204 requesting access to the Wi-Fi network. This request includes a device identifier from the mobile device 202, such as a MAC address or other device identifier.

The access point 204 includes hardware elements that generate the Wi-Fi network as well as memory (not shown) and a processor (not shown) for storing and locally-executing software elements including an access point controller 206 and a local authenticator 220. Together, the access point controller 206 and the local authenticator 220 perform local functions for controlling access to the Wi-Fi network of the access point 204. In some implementations, the access point controller 206 and/or local authenticator 220 are configured for communication with a cloud-based controller, referred to herein as a cloud-based authenticator 208. For example, the cloud-based authenticator 208 may be capable of remotely altering access settings at the access point 204. The local authenticator 220 and the cloud-based authenticator 208 are collectively referred to as a proximity-based device authenticator 218.

In different implementations, the various tasks of the proximity-based device authenticator 218 may be distributed differently between the local authenticator 220 and the cloud-based authenticator 208. In one implementation, the proximity-based device authenticator 218 is entirely cloud-based and all tasks described herein as performed by the local authenticator 220 are alternatively performed by the cloud-based authenticator 208. For example, the cloud-based authenticator 208 may include a cloud-based configuration panel that is adapted to dynamically alter settings enforced by the access point controller 206. In another implementation, one or more operations described herein as performed by the cloud-based authenticator 208 are performed on the access point 204 by the local authenticator 220.

When the access point controller 206 receives the request to access the Wi-Fi network of the access point 204, the access point controller 206 may check an associated whitelist (e.g., an inventory of known device identifiers that are permitted or denied access to the Wi-Fi network) to determine if the mobile device 202 has already been authorized for access to the Wi-Fi network. For example, the access point controller 206 may be configured to check a locally-stored whitelist and/or one or more remotely-stored whitelists. If the whitelist(s) indicate that the device identifier of the mobile device 202 is not permitted access, the proximity-based device authenticator 218 redirects the request (e.g., a 30×redirect) to a captive portal, as shown by the arrow annotated B. In one implementation, this redirect is affected by a locally-configured setting on the access point 204. In another implementation, the redirect is affected by commanding a remote configuration panel (e.g., a Cisco Meraki® access point) to alter a setting on the access point 204.

The captive portal 216 requests one or more types of personal identification information including a user account identifier, such as a phone number, email address, or other personal account contact information. In the illustrated example, the captive portal 216 prompts a user to provide a name and a phone number. In some implementations, the captive portal 216 prompts the user for a phone number but no other information. In other implementations, the captive portal 216 prompts the user for additional or different types of personal identification information, such as a mailing address, email address, social media account information, etc. The user provides the requested information into the captive portal and submits the information, such as by clicking a submit button 224.

FIG. 2B illustrates further example communications that are performed within the system 200 as part of the proximity-based device authentication process detailed with respect to FIG. 2A. In one implementation, the example communications shown in FIG. 2B are performed responsive to the example communications (A-B) shown and described above with respect to FIG. 2A. In a first communication annotated by arrow C, a user enters a user account identifier into a captive portal presented on the mobile device 202, such as in the manner described with respect to FIG. 2A. In the illustrated example, the user account identifier is a user-provided phone number. In other implementations, however, the user account identifier does not include a phone number but includes other contact information, such as an email address or identifying information for a social media account. The captive portal passes both the user account identifier and a device identifier (e.g., a MAC address or other identifier) for the mobile device 202 to the proximity-based device authenticator 218.

Responsive to receipt of the information provided through the captive portal 216, the proximity-based device authenticator 218 temporarily adds the device identifier for the mobile device 202 to an access point whitelist 210, as shown by arrow D. This action allows the mobile device 202 to temporarily connect to the Wi-Fi network.

The addition of the device identifier for the mobile device 202 to the access point whitelist 110 may be performed either by a series of commands executed on the access point or remotely-executed changes to the access point configuration, such as via commands sent to a third-party cloud-based API (e.g., enterprise-grade Cisco Meraki access points) that is adapted to remotely alter whitelist settings of the access point 204. In one implementation, the temporary whitelisting is affected on a whitelist remote (non-local) to the Wi-Fi network, as by the cloud-based authenticator 208 using a cloud-based configuration panel that controls settings on the access point 204.

The temporary whitelisting of the device identifier for the mobile device 202 is time-limited by a defined interval, such as five minutes. During this interval, the mobile device 202 is temporarily connected to the Wi-Fi network of the access point 204 and the system 200 attempts to authenticate an association between the user account identifier (e.g., user-provided phone number) and the device identifier of the mobile device 202. If the system 200 is unable to complete such authentication prior to expiration of the defined interval, the proximity-based device authenticator 218 removes the device identifier of the mobile device 202 from the access point whitelist 210 and the mobile device 202 is disconnected from the Wi-Fi network. In this case, the authentication process may be recommenced (e.g., at arrow A shown in FIG. 2A) when the user next attempts to connect the mobile device 202 to the Wi-Fi network.

In general, the term "temporary connection" is used herein to refer to a temporary connection between a device and a Wi-Fi network that is achieved by way of a temporary whitelisting of a device identifier of the device. A captive connection, in contrast, refers to a limited connection between a device and a Wi-Fi network where the device is permitted to interact exclusively with a captive portal screen or a very limited number of authorized webpage. As used herein, the term temporary connection refers to a connection that is not a captive connection (e.g., during a temporary connection, the device may also access webpages through the Wi-Fi network that are external to the captive portal and its authorized webpages).

While the device identifier for the mobile device 202 is temporarily whitelisted as described above, the proximity-based device authenticator 218 stores the user account identifier (e.g., a user-provided phone number) in association with the device identifier of the mobile device 202 and performs further operations to confirm the validity of this association (e.g., to confirm that the user-provided phone number is assigned, by a telecommunications company, to the mobile device 202 with the detected device identifier). The proximity-based device authenticator 218 initiates transmission of data to a destination associated with the user account identifier. In the illustrated implementation, the proximity-based device authenticator 218 transmits this data in the form of a request to an SMS Gateway 212 (as indicated by arrow E) to instruct the SMS Gateway 212 to send a short message service (SMS) message (e.g., text message) to the user-provided phone number. For example, this request may identify both the user-provided phone number and also a URL that the proximity-based device authenticator 218 uses to confirm whether the device receiving the SMS message also has the device identifier that the proximity-based device authenticator 218 has temporarily stored in association with the user-provided phone number. In one implementation, the proximity-based device authenticator 218 uniquely generates a URL responsive to each request to access its Wi-Fi network. Each uniquely-generated URL can then be stored in association with the user account identifier (e.g., the user-provided phone number, email address, or other account identifier).

In various implementations, the request (annotated by arrow E) to the SMS Gateway 212 may be provided by either the local authenticator 220 or the cloud-based authenticator 208.

Responsive to receipt of the SMS message instruction from the proximity-based device authenticator 218, the SMS Gateway 212 transmits an SMS message 230 to a short message service center (SMSC) 244 of the wireless carrier associated with the phone number, as indicated by an arrow annotated with letter F. The SMSC, in turn, transmits the SMS message 230 to the user-provided phone number, as indicated by an arrow annotated with letter G. If the user-provided phone number is assigned to the mobile device 202 by a telecommunications provider, the user receives the SMS message 230 on the mobile device 202.

In the illustrated implementation, the SMS message 230 includes a URL. In another implementation, the SMS message 230 does not include a URL, but instead includes an instruction directing a user to navigate to a particular URL or perform other operations to acquire a URL. This may be the case when, for example, the mobile device 202 is not a mobile phone and the user instead provides a phone number to a captive portal on an alternate type of device (e.g., a laptop) to initiate transmission of the SMS message 230 to a mobile phone that the user is currently carrying on-person. In this scenario, the user may receive the URL in a text message received on a mobile phone and navigate to the URL on the mobile device 202 that was used to provide the phone number to the captive portal.

In still another implementation, the proximity-based device authenticator 218 transmits the URL to the user of the mobile device 202 by a means other than SMS message. For example, the user account identifier provided through the captive portal may include an email address or other online account information, such as information identifying a social media account. In this case, the proximity-based device authenticator 218 transmits the URL to the user of the mobile device 202 using this other contact information instead of a phone number. For example, the proximity-based device authenticator 218 may transmit an email that includes the URL to a user-provided email address or transmit the URL via a message to a social media account identified by the user account identifier. Rather than authenticate an association between the device identifier and a phone number, this methodology is instead usable to establish that a person with physical possession of the mobile device 202 (e.g., the device having the received device identifier) is also able to access the account identified by the user account identifier.

FIG. 2C illustrates further example communications that are performed within the system 200 as part of the proximity-based device authentication process detailed with respect to FIG. 2A-2B. In one implementation, the example communications of FIG. 2C are performed responsive to the example communications (A-F) shown and described above with respect to FIGS. 2A and 2B. During a time period in which the mobile device 202 is temporarily whitelisted to access the Wi-Fi network of the access point 204, a mobile device 203 (e.g., either the mobile device 202 or a different mobile device) transmits a request (annotated by arrow H) to access a URL. In one implementation, a user initiates this URL access request by clicking on a URL included in an SMS message from the proximity-based device authenticator 218, as described above with respect to FIG. 2B. In another implementation, a user requests access to the URL by clicking on a link received in a non-SMS message, such as an email or a message received through a social media account.

The use of a different number (203) for the mobile device of FIG. 2C is intended to convey that the device requesting the URL may, in some instances, be different than the mobile device 202 of FIGS. 2A and 2B that initiates the authentication process by providing the user account identifier (e.g., phone number, email address, etc.) to the captive portal 216. For example, the mobile device 203 may be different from the mobile device 202 if the user initially provides an incorrect phone number to the captive portal 216.

If the request to access the URL originates on a network that is not the Wi-Fi network of the access point 204 (e.g., at an alternate access point 232), this implies either that (1) the URL was transmitted to a device other than the mobile device 202 (e.g., a device in the possession of a different user) or (2) the URL was transmitted to the mobile device 202, but at a time when the device is no longer on the local Wi-Fi network of the access point 204. In either of these scenarios, the URL request is not received by the access point 204, and the proximity-based device authenticator 218 does not have visibility into the nature or existence of the request. Consequently, the authentication of the mobile device 202 fails upon expiration of the time-out interval set in association with the temporary whitelisting of the device identifier for the mobile device 202.

In the above-described scenario where the mobile device 203 is not on the network of the access point 204 at the time of the request to access the URL, an alternate access point 232 handles the request by accessing its designated DNS server, which is identified in FIG. 2C as ISP DNS 240. The ISP DNS 240 retrieves an entry associating a host of the requested URL with the host's own authoritative DNS server (shown in FIG. 2C as URL Host Authoritative DNS Server 242) and accesses the host's authoritative DNS 242 to identify a specific IP address to which the request is subsequently directed. In this scenario, the user is directed to a first web page, such as one that displays an error message 236, as shown.

If, alternatively, the request to access the URL originates on the access point 204, the proximity-based device authenticator 218 interprets this scenario as implying that mobile device 203 has a proximity that satisfies a location similarity (e.g., being on the same Wi-Fi network) with the mobile device 202 that provided the user account identifier to the captive portal. In implementations where the URL is transmitted via SMS message (as in the illustrated example), the receipt of this request at the access point 204 serves to confirm that the device assigned to the user-provided phone number is currently on-hand of the same person as the mobile device 202 with the device identifier that originally provided the phone number via the captive portal 216. If, for example, the mobile device 202 is a phone assigned to the user-provided phone number, the receipt of the URL access request at the access point 204 serves to confirm that the mobile device 203 with the user-provided phone number is the same as the mobile device 202 with the device identifier that originally provided the phone number via the captive portal 216.

In implementations where the URL is transmitted to the user via a means other than SMS message, such as within an email, the receipt of a request to access the URL from a location on the Wi-Fi network of the access point 204 serves to confirm that the person who has access to the account identified by the user account identifier is also the person who is in physical possession of the mobile device 202 with the received device identifier.

When the proximity-based device authenticator 218 determines that the requested URL matches the URL previously transmitted (e.g., via SMS message), this confirmation serves as a final step in the authentication process that effectively "binds" the user account identifier to the device identifier of the mobile device 202 that was passed through the captive portal along with the user account identifier.

In one implementation, the proximity-based device authenticator 218 performs a further check to confirm that the device identifier (e.g., MAC address or other hardware identifier) passed through the captive portal also matches the device identifier of the device requesting the URL. In other implementations, this step is not performed since the mere fact that the mobile device 203 is within range of the Wi-Fi network, at the time of the URL request, provides a high level of certainty in the likelihood that the device requesting the URL is also the same device that provided the phone number through the captive portal 216 on the Wi-Fi network.

Responsive to receipt of the URL request from the location on the Wi-Fi network, the access point controller 206 and the local authenticator 220 perform actions to execute the request and complete the device authentication.

Responsive to determining that the URL in the transmitted SMS matches the URL request received at the access point 204, the local authenticator 220 updates the access point whitelist 210 (as indicated by an arrow I) to grant the mobile device 203 with the detected device identifier permanent access to the network. As a result of this permanent whitelisting, the mobile device 203 is permitted to bypass the captive portal and granted automatic non-captive access to the local Wi-Fi network of the access point 204 whenever the mobile device 203 comes into range of the local Wi-Fi network in the future. As used herein, "automatic non-captive access" refers to a scenario where a mobile device is permitted automatic access to a Wi-Fi network without requiring user interaction with (e.g., viewing or providing inputs to) a captive portal.

In the illustrated implementation, the proximity-based device authenticator 218 also transmits a notification to one or more third-party systems 234 (as indicated by an arrow J) to notify such systems of the successful device authentication.

Further, the mobile device 203 executes the URL request by querying a specially-configured DNS 214 of the access point 204 with the URL. The specially-configured DNS 214 returns an IP address that is managed by the proximity-based device authenticator 218 and different than the IP address that the ISP DNS 240 would resolve from the URL Host Authoritative DNS 242. The mobile device 203 then uses the Wi-Fi network of the access point 204 to connect to the IP address returned by the specially-configured DNS server 214 and, once connected to this IP address, makes a request (e.g., an https://request) to the URL. The proximity-based device authenticator 218 receives and services this request by matching the URL request with data from a database and returning that data to the mobile device 203. In one implementation, the data returned to the mobile device 203 includes a confirmation page 238 indicating that the device authentication is complete and/or that the mobile device 203 may permanently have automatic non-captive access to the Wi-Fi.

In one implementation, the specially-configured DNS 214 routes the mobile device 203 to a webpage that has been selected as a redirect destination by one of the third-party systems 234. For example, the user may be directed to a home page for the business that manages the access point 204, a webpage with a coupon, etc.

Figure 3:
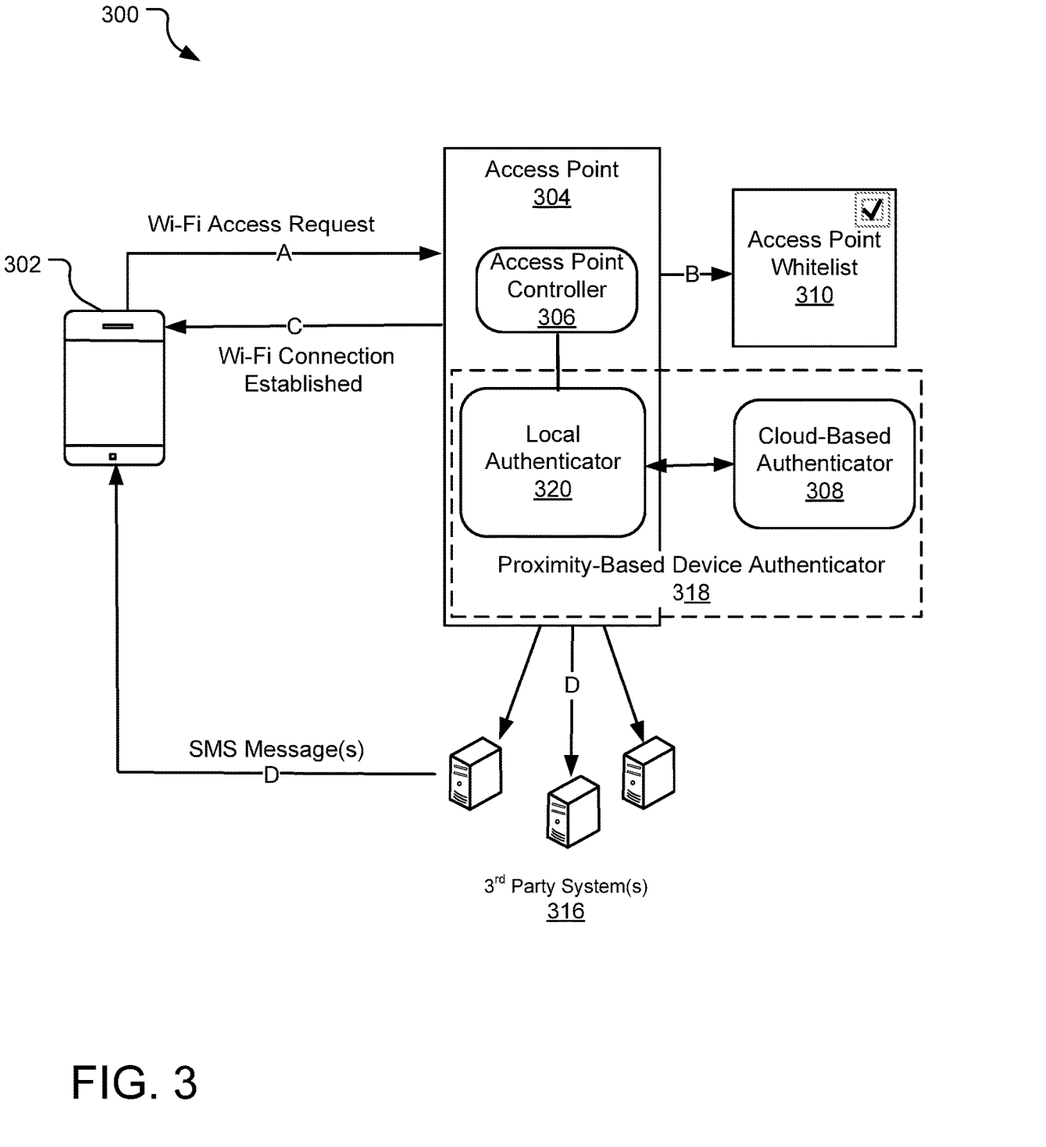
FIG. 3 illustrates example communications performed by a system that implements proximity-based device authentication.

FIG. 3 illustrates example communications performed by a system 300 that implements proximity-based device authentication. In one implementation, the example communications shown in FIG. 3 are performed after a mobile device 302 has been authenticated in association with a user account identifier, such as in the manner described above with respect to FIG. 2A-2C. When a mobile device 302 comes within range of a Wi-Fi network generated by an access point 304, the mobile device 302 attempts to connect to the Wi-Fi network and sends a request (e.g., as indicated by arrow A) that includes a self-identifying device identifier (e.g., a MAC address). An access point controller 306 checks a local access point whitelist 310 and confirms that the device identifier is included on the whitelist. Consequently, the access point controller 306 permits the mobile device 302 automatic non-captive access to the local Wi-Fi network (as annotated by arrow C). From the perspective of a user of the mobile device 302, the Wi-Fi connection is automatically established without user input. When the mobile device 302 connects to the Wi-Fi network, a proximity-based device authenticator 318 transmits notification(s) (as annotated by arrow D) to one or more third-party systems 316 to indicate that a registered user device has re-joined the Wi-Fi network. The notified system(s) 316 may then take further actions based on this information. In one implementation, the third-party system(s) 316 send a text message to the mobile device 302, as indicated by arrow D, such as a text message that includes information pertaining to a location-based subscription, as generally described with respect to FIG. 1.

The proximity-based device authenticator 318 may include local submodules (e.g., a local authenticator) and/or remotely-executed sub-modules (e.g., a cloud-based authenticator 308), as shown. Other aspects of the proximity-based device authenticator 318 not explicitly disclosed may be the same or similar to those disclosed with respect to other implementations.

Figure 4:
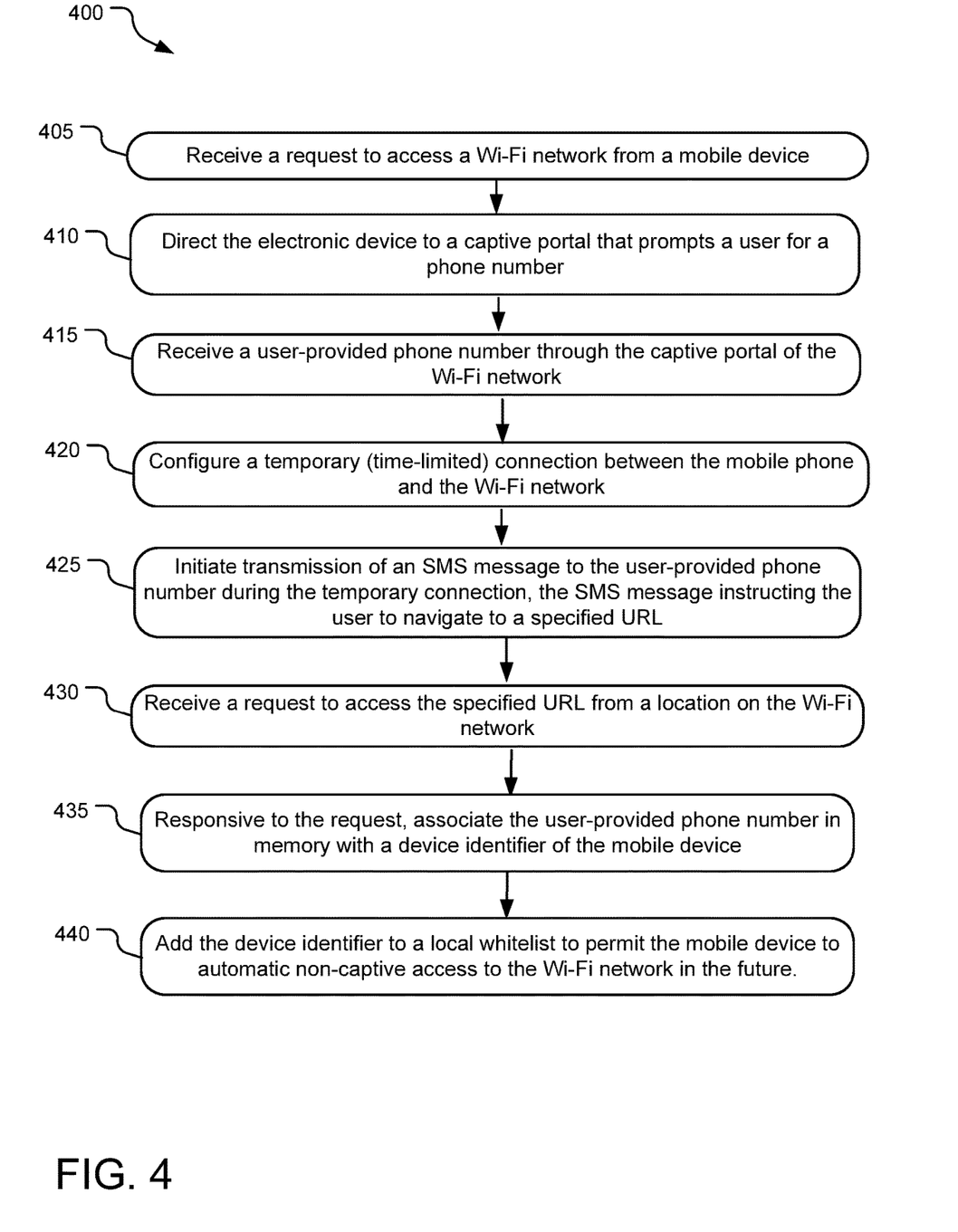
FIG. 4 illustrates example operations for proximity-based authentication of a mobile phone.

FIG. 4 illustrates example operations 400 for proximity-based authentication of a mobile device with internet access capability. A receiving operation 405 receives a request from the mobile device requesting access to a Wi-Fi network. A direction operation 410 directs the mobile device to a captive portal that prompts a user for a mobile phone number of a device on-hand. If the mobile device is a phone, the user may supply the phone number of the mobile device. In another implementation, the user provides a personal mobile phone number for an on-hand mobile phone into a captive portal that is presented on a laptop or other non-phone device.

A receiving operation 415 receives a user-provided phone number through the captive portal.

Responsive to receipt of the user-provided phone number, a configuration operation 420 configures a temporary (time-limited) connection between the mobile device and the Wi-Fi network. A text message transmission operation 425 initiates transmission of an SMS message to the mobile phone. The SMS message identifies a URL and provides an instruction for the user to navigate to the URL to authenticate the device. In one implementation, the SMS message includes an URL and a message instructing the user to click the URL. In another implementation, the message includes a directive for the user to type a specific URL into a web browser of the mobile device interfacing with the captive portal.

A receiving operation 430 receives a request to access the specified URL from a location on the Wi-Fi network. An instance of the receiving operation 430 generally signifies that a device on the local Wi-Fi network has received the SMS message in response to the submission of input through the captive portal presented on the Wi-Fi network.

Responsive to the receipt of the request to access the specified URL, an association operation 435 associates the user-provided phone number in memory with a device identifier, such as a MAC address or other identifier of the mobile device that provided the inputs through the captive portal. For example, the association operation 435 may create a log of authenticated (registered) devices, where each entry includes a device identifier and the associated phone number.

In one implementation, an access point reconfiguration operation 440 permanently adds the device identifier to a local whitelist, allowing the mobile device automatic non-captive access to the Wi-Fi network and to bypass the captive portal in the future.

Figure 5:
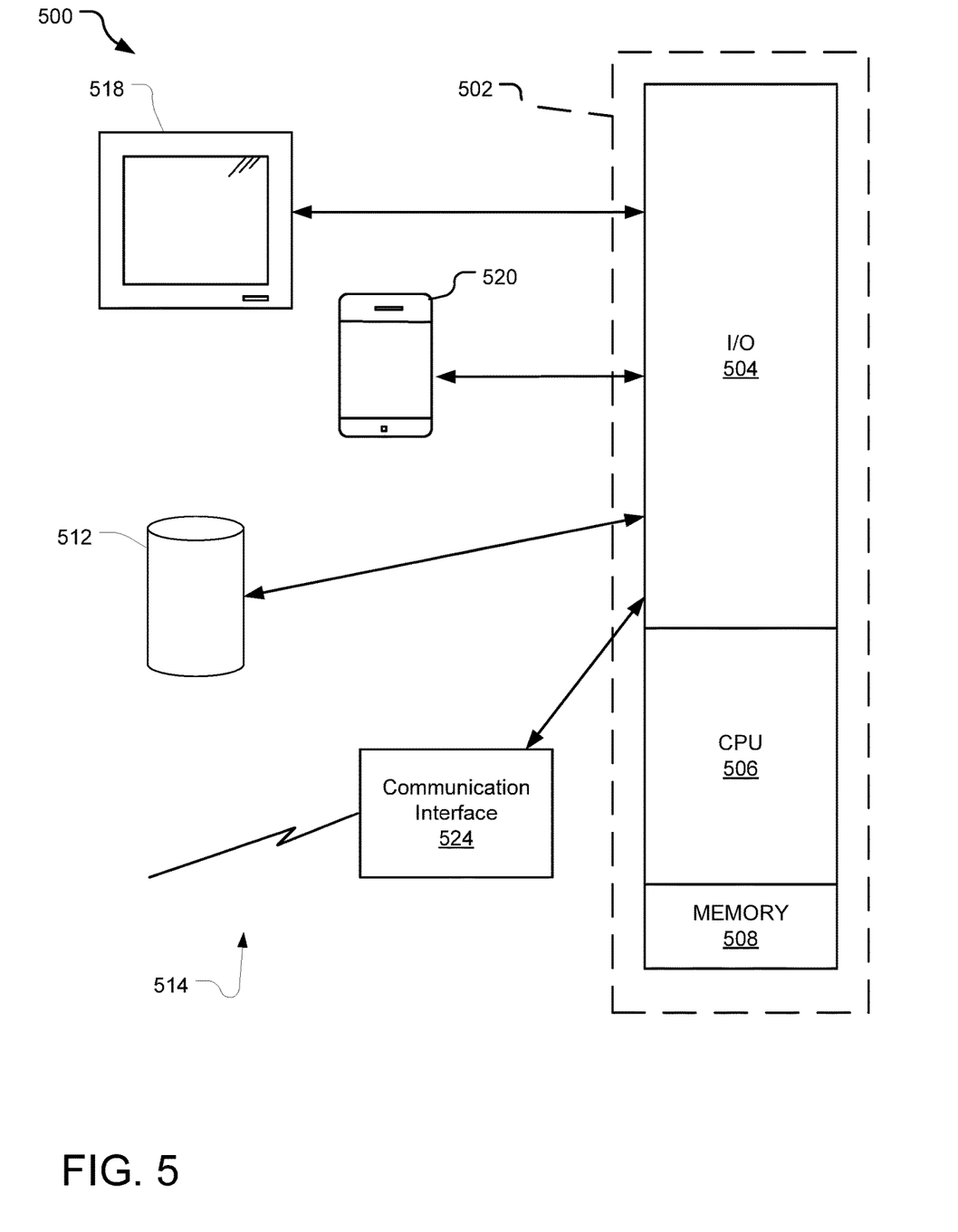
FIG. 5 discloses a block diagram of an example processing system suitable for implementing one or more aspects of a proximity-based device authentication system.

FIG. 5 discloses a block diagram of an example processing system 500 suitable for implementing one or more aspects of a proximity-based device authentication system. The processing system 500 is capable of executing a computer program product embodied in a tangible computer-readable storage medium to execute a computer process. The processing system 500 includes a processor 502 is shown having an input/output (I/O) section 504, a Central Processing Unit (CPU) 506, and a memory section 508, which may comprise a combination of volatile and non-volatile memory. There may be one or more processors 502, such that the processor 502 of the computing system 500, that comprises a single central-processing unit 506, or a plurality of processing units. The processing unit 502 may include one or multiple single core or multi-core processors.

The described technology is optionally implemented in software loaded in the memory 508, a storage unit 512, and/or communicated via a wired or wireless network link 514 on a carrier signal (e.g., Ethernet, 3G wireless, 5G wireless, LTE (Long Term Evolution)) thereby transforming the computing system 500 in FIG. 5 to a special purpose machine for implementing the described operations.

In one implementation, the processing system 500 is integrated within a Wi-Fi access point and the memory section 508 stores locally-executed software that performs some or all functionality of a proximity-based device authenticator, such as the local authenticator 220 described with respect to FIG. 2A-2C. In another implementation, the processing system 500 is included on a remote server capable of adjusting configuration settings of an access point, such as to perform functions of the cloud-based authenticator 208 described with respect to FIG. 2A-2C.

The I/O section 504 may be connected to one or more user-interface devices (e.g., a keyboard, a touch-screen display unit 518) and/or one or more processing devices such as a mobile device 520 (e.g., a phone, tablet, or other smart device). Additionally, the I/O section 504 may be connected to a storage unit 512. Computer program products containing mechanisms to effectuate the systems and methods in accordance with the described technology may reside in the memory section 508 or on the storage unit 512.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 may include a modem, a network adapter, or any other type of communications device for establishing communications over the wide area network. In a networked environment, program modules depicted relative to the computing system 500 or portions thereof, may be stored in a remote memory storage device. It is appreciated that the network connections shown are examples of communications devices for and other means of establishing a communications link between the computers may be used.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
   memory; and
   a proximity-based device authenticator stored in the memory and executable to:
   receive a device identifier identifying an electronic device requesting access to a Wi-Fi network;
   enable a temporary connection between the electronic device and the Wi-Fi network responsive to receipt of a user account identifier received through a captive portal, the temporary connection being associated with a timeout interval;
   initiate transmission of data to a destination associated with the user account identifier, the data identifying a uniform resource locator (URL); and
   receive a request to access the URL, the request originating from a location on the Wi-Fi network;
   responsive to determining that the URL access request originated from the location on the Wi-Fi network prior to expiration of the timeout interval, identify the electronic device as a verified device for the Wi-Fi network and alter an access point setting to grant the electronic device with the device identifier automatic non-captive access to the Wi-Fi network.

2. The system of claim 1, wherein the user account identifier includes a user-provided phone number and the data transmitted responsive to receipt of the user account identifier includes an SMS message sent to the user-provided phone number.

3. The system of claim 2, wherein the proximity-based device authenticator is further configured to:
associate, in memory, the device identifier with the user-provided phone number responsive to receipt of the request to access the URL from the location on the Wi-Fi network.

4. The system of claim 2, wherein the proximity-based device authenticator transmits the user-provided phone number and the device identifier to one or more third-party systems responsive to receipt of the request to access the URL from the location on the Wi-Fi network.

5. The system of claim 1, wherein the proximity-based device authenticator is further executable to direct the electronic device to a first IP address when the request to access the URL is received from the location on the Wi-Fi network, the first IP address being different than a second IP address to which the electronic device is directed when the request to access the URL is received from a location external to the Wi-Fi network.

6. The system of claim 1, wherein the device identifier includes a media access control (MAC) address.

7. The system of claim 1, wherein the proximity-based device authenticator is further executable to:
receive a subsequent request from the electronic device to access the Wi-Fi network;
confirm that the device identifier for the electronic device is included on at least one of a local or remote whitelist;
enable a connection between the electronic device and the Wi-Fi network without directing the electronic device to the captive portal responsive to the confirmation of the device identifier being included on the at least one of the local or remote whitelist.

8. The system of claim 7, wherein the proximity-based device authenticator is further executable to:
notify one or more third-party systems responsive to detection of a subsequent request from the electronic device to access the Wi-Fi network.

9. The system of claim 1, wherein the proximity-based device authenticator is further executable to: identify the electronic device as a verified device for the Wi-Fi network by confirming a match between the device id received in association with the request to access the W-FI network and a device identifier of a device that places the request to access the URL.

10. One or more non-transitory tangible computer-readable storage media encoding computer-executable instructions for executing on a computer system a computer process authenticating an association between a device identifier and a user account identifier, the computer process further comprising:
receiving the device identifier from an electronic device requesting access to a Wi-Fi network; and
enabling a temporary connection between the electronic device and the Wi-Fi network responsive to receipt of the user account identifier received through a captive portal, the temporary connection being associated with a timeout interval;
initiating transmission of data to a destination associated with the user account identifier, the data identifying a uniform resource locator (URL);
receiving a request to access the URL, the request originating from a location on the Wi-Fi network; and
responsive to determining that the URL access request originated from the location on the Wi-Fi network prior to expiration of the timeout interval:
identifying the electronic device as a verified device for the Wi-Fi network; and
altering an access point setting to grant the electronic device with the received device identifier automatic non-captive access to the Wi-Fi network.

11. The one or more non-transitory computer-readable storage media of claim 10, wherein the user account identifier includes a user-provided phone number and the data transmitted responsive to receipt of the user account identifier includes a short message service (SMS) message sent to the user-provided phone number.

12. The one or more non-transitory computer-readable storage media of claim 11, wherein the process further comprises:
associating, in memory, the device identifier with the user-provided phone number responsive to receipt of the request to access the URL from the location on the Wi-Fi network.

13. The one or more non-transitory computer-readable storage media of claim 11, wherein the computer process further comprises:
transmitting the user-provided phone number and the device identifier to one or more third-party systems responsive to receipt of the request to access the URL from the location on the Wi-Fi network.

14. The one or more non-transitory computer-readable storage media of claim 10, wherein the computer process further comprises:
directing the electronic device to a first IP address when the request to access the URL is received from the location on the Wi-Fi network, the first IP address being different than a second IP address to which the electronic device is directed when the request to access the URL is received from a location external to the Wi-Fi network.

15. The one or more non-transitory computer-readable storage media of claim 10, wherein the device identifier includes a media access control (MAC) address.

16. The one or more non-transitory computer-readable storage media of claim 10, further comprising:
receiving a subsequent request from the electronic device to access the Wi-Fi network; determining that the device identifier for the electronic device is included on at least one of a local whitelist or remote whitelist;
enabling a connection between the electronic device and the Wi-Fi network without directing the electronic device to the captive portal in response to the determination.

17. The one or more non-transitory computer-readable storage media of claim 10, wherein the computer process further comprises:
notifying one or more third-party systems responsive to detection of a subsequent request from the electronic device to access the Wi-Fi network.

18. One or more non-transitory tangible computer-readable storage media encoding computer-executable instructions for executing on a computer system a computer process authenticating an association between a device identifier and a user-provided phone number, the computer process comprising:
    receiving the device identifier from an electronic device requesting access to a Wi-Fi network;
    enabling a temporary connection between the electronic device and the Wi-Fi network responsive to receipt of the user-provided phone number received through a captive portal, the temporary connection being associated with a timeout interval;
    initiating transmission of a short message service (SMS) message to the user-provided phone number during the temporary connection, the SMS message identifying a uniform resource locator (URL);
    receiving a request to access the URL, the request originating from a location on the Wi-Fi network;
    responsive to determining that the URL access request originated from the location on the Wi-Fi network prior to expiration of the timeout interval, identifying the electronic device as a verified device for the Wi-Fi network;
    associating, in memory, the device identifier with the user-provided phone number responsive to identifying the device as a verified device; and
    transmitting the user-provided phone number and the device identifier to one or more third-party systems responsive to receipt of the request to access the URL from the location on the Wi-Fi network.

19. The one or more non-transitory computer-readable storage media of claim 18, wherein the computer process further comprises:
    altering an access point setting to grant the electronic device automatic non-captive access to the Wi-Fi network responsive to the request to access the URL from the location on the Wi-Fi network.

20. The one or more non-transitory computer-readable storage media of claim 19, wherein the computer process further comprises:
    enabling a temporary connection between the electronic device and the Wi-Fi network responsive to receipt of the user-provided phone number at the captive portal, wherein the access point setting is altered when the request to access the URL is received within a timeout period defining the length of the temporary connection.

21. The one or more non-transitory computer-readable storage media of claim 18, wherein the computer process further comprises:
    directing the electronic device to a first IP address when the request to access the URL is received from the location on the Wi-Fi network, the first IP address being different than a second IP address to which the electronic device is directed when the request to access the URL is received from a location external to the Wi-Fi network.

* * * * *